United States Patent [19]

Goldstein et al.

[11] 4,437,429

[45] Mar. 20, 1984

[54] ANIMAL LITTER

[75] Inventors: Joel Goldstein, Ambler; Albert Abrevaya, Chalfont, both of Pa.

[73] Assignee: Aquarium Pharmaceuticals, Inc., Perkasie, Pa.

[21] Appl. No.: 289,864

[22] Filed: Aug. 4, 1981

[51] Int. Cl.³ .............................................. A01K 1/015
[52] U.S. Cl. ........................................................ 119/1
[58] Field of Search ............................................ 119/1

[56] References Cited

U.S. PATENT DOCUMENTS

| | | | |
|---|---|---|---|
| 2,649,759 | 8/1953 | Gibbs | 119/1 |
| 2,848,976 | 8/1958 | Combs | 119/1 |
| 2,895,873 | 7/1959 | Sawyer, Jr. et al. | 167/42 |
| 3,029,783 | 4/1962 | Sawyer, Jr. et al. | 119/1 |
| 3,154,052 | 10/1964 | Sweeney | 119/1 |
| 3,284,273 | 11/1966 | Prentice | 119/1 X |
| 3,735,734 | 5/1973 | Pierce et al. | 119/1 |
| 3,776,188 | 12/1973 | Komakine | 119/1 |
| 3,898,324 | 8/1975 | Komakine | 424/76 |
| 4,009,684 | 3/1977 | Kliment et al. | 119/1 |
| 4,059,543 | 11/1977 | Kiovsky et al. | 252/455 Z |
| 4,085,704 | 4/1978 | Frazier | 119/1 |
| 4,256,728 | 3/1981 | Nishino et al. | 422/4 |

OTHER PUBLICATIONS

Natural Zeolites Occurrence, Properties, Use, Editors: Sand, L. B., Mumpton, F. A., Pergamon Press Ltd., Oxford, England, pp. 20-21.

Primary Examiner—Hugh R. Chamblee
Attorney, Agent, or Firm—Panitch, Schwarze, Jacobs & Nadel

[57] ABSTRACT

An improved animal litter is disclosed which extends the life of clay containing litter two to three times by the use of zeolites, such as clinoptilolite.

18 Claims, No Drawings

ANIMAL LITTER

BACKGROUND OF THE INVENTION

This invention relates to an improved animal litter and a method for reducing the ammonia odor in animal litter.

The housing of small animals presents many well known difficulties concerning the disposal of their wastes. Generally, such disposal is accomplished by the use of animal litter capable of sorbing the liquid wastes to a sufficient degree such that the litter is useful for at least several days before noxious odors emanating from the litter necessitate its removal.

Various substances are commonly utilized as litter materials for animals. Such substances include clays, for example, bentonites and fuller's earth (attapulgite); diatomaceous earth (kieselguhr); vermiculite; parts of plants, for example, straw, sorghum, corn cob, sugar cane stalks, peanut hulls and cotton seed hulls; wood chips; paper and sawdust. All of these materials are generally characterized by a relatively high surface area and high moisture absorbency.

A desirable litter is one that not only possesses high water sorptivity, but also has the following attributes:

(1) high sorptivity for odors, particularly ammoniacal odors,
(2) a low degree of dusting,
(3) adequate crush strength,
(4) self-sanitizing, and
(5) non-toxic.

Conventional litter materials are somewhat objectionable in that they fail to adequately suppress odors. These odors are generated as the liquids absorbed by the litter material turn from acidic to basic giving off odoriferous substances, particularly ammonia.

U.S. Pat. Nos. 3,776,118 and 3,898,324 concerning inhibiting the formation of odors from poultry farms. These patents disclose the use of a dried fine powder of zeolite mixed with a course powder of crystalline ferrous sulfate hepta-hydrate. The use of zeolites in these patents is to impart stability with the deodorizing accomplished by the sulfate hepta-hydrate.

In U.S. Pat. No. 4,085,704, a zeolite serves as a vehicle for an odor control agent, such as a perfume, flavoring, fragrance or essence oil.

In U.S. Pat. No. 4,256,728, zeolites are described for use in a deodorization method. In this patent, however, the zeolite acts as a support for an acid, such acid serving as the deodorization agent.

U.S. Pat. No. 4,059,545 discloses the use of clinoptilolite in the ammonia exchanged form and treated with a dilute solution of a strong acid to act as an absorbent for acid gases.

The use of zeolites by themselves as litter materials has generally been unsuccessful due to their poor water sorption properties as compared to clays. It was heretofore believed that for zeolites to be effective as an odor controlling agent in animal litter, 100 percent zeolite had to be used to ensure that all the animal urine dropped directly on the zeolite to effect ion exchange of the ammonia contained therein.

SUMMARY OF THE INVENTION

It has now been discovered that ammonia odor can be reduced from clay containing animal litter to increase the useful life of the litter two to three fold by a method involving the addition to the clay containing litter of an effective amount of hydrated zeolite. The present invention is particularly useful for the control of odors from pet litter, for example, small animal and cat litters.

DETAILED DESCRIPTION OF THE INVENTION

The improved animal litter of the present invention utilizes a sorptive, non-colloidal granular aluminosilicate such as a clay. Suitable clays for this invention include the attapulgites and the bentonites (clays mainly composed of the mineral montmorillonite). Attapulgus fuller's earth is a particularly preferred clay for use in the present invention. The principal mineral constituent of fuller's earth is attapulgite, a complex hydrated aluminum-magnesium-silicate with a needle-like shape. Fuller's earth is generally mined in Georgia, Florida, Texas, Illinois, California and Utah. Typical ranges for the components of fuller's earth are given below in Table 1.

TABLE 1

| Component | Wt. % on Volatile-Free Basis |
|---|---|
| $SiO_2$ | 62–75 |
| $Al_2O_3$ | 12–22 |
| $Fe_2O_3$ | 2–5 |
| $MgO$ | 1–12 |
| $CaO$ | 0.5–2 |
| $K_2O$ | 0.1–1 |
| $Na_2O$ | 0.1–0.2 |

Added to the clay component of the animal litter is an effective amount of hydrated zeolite. The zeolite is not heat-treated (calcined) and thus it contains its original water of hydration. It is not sufficient that water is added to a previously heat-treated zeolite in which the original water of hydration was driven-off.

Zeolites, whether they be natural or synthetic, are characterized by an aluminosilicate tetrahedral framework, and have ion exchangeable large cations and loosely held water molecules permitting reversible dehydration. The general formula for a zeolite is as follows: $MO.Al_2O_3.nSiO_2.xH_2O$, where M is Na, K, Ca, Sr or Ba and n and x are integers.

Since the oxygen atoms in the framework of the zeolite are each shared by two tetrahedrons, the (Si, Al):O ratio is exactly 1:2. The amount of large cations present is dependent on the aluminum to silicon ratio and the formal charge of these large cations. The large cations, which are coordinated by framework oxygens and water molecules, reside in large cavities in the crystal structure. These cavities and channels may even permit the selective passage of organic molecules.

Zeolites are low-temperature and low-pressure minerals that commonly occur as late minerals in amygdaliodal basalts, as devitrification products; as authigenic minerals in sandstones and other sediments, and as alteration products of feldspars and nepheline. Phillipsite and laumontite occur extensively in sediments on the ocean floor. Stilbite, heulandite, analcime, chabazite, and scolecite are common as large crystals in vesicles and cavitites in the basalts of the Minas Basin Region, Nova Scotia; West Paterson, N.J.; the Columbia River Plateau; Berufjord, Iceland; Poona, India; and many other localities. An exemplary listing of natural zeolites is given below in Table 2.

TABLE 2

| Group | Name | Formula |
|---|---|---|
| Analcime | Analcime | $Na(AlSi_2O_6) \cdot H_2O$ |
| | Wairakite | $Ca(AlSi_2O_6) \cdot H_2O$ |
| | Pollucite | $Cs(AlSi_2O_6) \cdot xH_2O$ |
| Sodalite | Sodalite | $Na_4(Al_3Si_3O_{12})Cl$ |
| | Faujasite | $(Na_2,Ca)_{30}((Al,Si)_{192}O_{384}) \cdot 260H_2O$ |
| Chabazite | Chabazite | $Ca_2(Al_4Si_8O_{24}) \cdot 13H_2O$ |
| | Gmelinite | $Na_2(Al_2Si_4O_{12}) \cdot 6H_2O$ |
| | Erionite, Offretite | $Ca_{4.5}(Al_9Si_{27}O_{72}) \cdot 27H_2O$ |
| | Levynite | $Ca(Al_2Si_4O_{12}) \cdot 6H_2O$ |
| Natrolite | Natrolite | $Na_2(Al_2Si_3O_{10}) \cdot 2H_2O$ |
| | Scolecite | $Ca(Al_2Si_3O_{10}) \cdot 3H_2O$ |
| | Mesolite | $Na_2Ca_2(Al_2Si_3O_{10}) \cdot 8H_2O$ |
| | Edingtonite | $Ba(Al_2Si_3O_{10}) \cdot 3H_2O$ |
| | Thomsonite | $NaCa_2(Al_5Si_5O_{20}) \cdot 6H_2O$ |
| | Gonnardite | $(Ca,Na)_{6-8}((Si,Al)_{20}O_{40}) \cdot 12H_2O$ |
| Phillipsite | Phillipsite | $(K,Na)_5(Al_5Si_{11}O_{32}) \cdot 10H_2O$ |
| | Harmontome | $Ba_2(Al_4Si_{12}O_{32}) \cdot 12H_2O$ |
| | Gismondine | $Ca(Al_2Si_2O_8) \cdot 4H_2O$ |
| | Garronite | $NaCa_{2.5}(Al_6Si_{10}O_{32}) \cdot 13H_2O$ |
| Mordenite | Mordenite | $Na(AlSi_5O_{12}) \cdot 3H_2O$ |
| | Diachiardite | $(Na_2,Ca)_2(Al_4Si_{20}O_{48}) \cdot 12H_2O$ |
| Other | Heulandite | $Ca(Al_2Si_7O_{18}) \cdot 6H_2O$ |
| | Brewsterite | $Sr(Al_2Si_6O_{16}) \cdot 5H_2O$ |
| | Epistilbite | $Ca(Al_2Si_6O_{16}) \cdot H_2O$ |
| | Stilbite | $Na_2Ca_4(Al_{10}Si_{26}O_{72}) \cdot 28H_2O$ |
| | Yugawaralite | $Ca_4(Al_7Si_{20}O_{54}) \cdot 14H_2O$ |
| | Laumontite | $Ca(Al_2Si_4O_{12}) \cdot 4H_2O$ |
| | Ferrierite | $Na_4Mg_2(OH)_2(Al_6Si_{30}O_{72}) \cdot 18H_2O$ |
| | Paulingite | $(K,Ca)_{120}((Al,Si)_{580}O_{1160}) \cdot 690H_2O$ |

Prior art techniques have resulted in the formation of a great variety of synthetic aluminosilicate zeolites. These zeolites have come to be designated by letter or other convenient symbols, as illustrated by zeolite A (U.S. Pat. No. 2,882,243), zeolite X (U.S. Pat. No. 2,882,244), zeolite Y (U.S. Pat. No. 3,130,007), zeolite ZK-5 (U.S. Pat. No. 3,247,195), zeolite ZK-4 (U.S. Pat. No. 3,314,752), zeolite ZSM-5 (U.S. Pat. No. 3,702,886), zeolite ZSM-11 (U.S. Pat. No. 3,709,979), zeolite ZSM-12 (U.S. Pat. No. 3,832,449), zeolite ZSM-20 (U.S. Pat. No. 3,972,983), ZSM-23 (U.S. Pat. No. 4,075,842), ZSM-35 (U.S. Pat. No. 4,016,245), ZSM-38 (U.S. Pat. No. 4,046,859), merely to name a few.

The preferred zeolite for use in the present invention is the natural zeolite clinoptilolite. Clinoptilolite has the formula $(Ca,Na_2,K_2)O \cdot Al_2O_3 \cdot 10SiO_2 \cdot 7H_2O$ and is a dimorphorous form of ptilolite. Clinoptilolite is found is substantial deposits in the Western United States.

It is preferred to use zeolites in accordance with this invention in chip form with the amount of zeolite to total clay and zeolite ranging from between about 10 weight percent and 60 weight percent, preferably between about 15 weight percent and 25 weight percent.

In another embodiment of this invention, zeolite such as clinoptilolite chips, can be added in the form of a zeolite containing pad to the litter material. The pad includes top and bottom layers of sorptive sheet material filled with the zeolite. The pad is placed below standard clay litter material or under small animal cages. The sheets can be composed of any convenient sorptive sheet material such as paper, cardboard or cloth.

In experiments with 50 cat owners using double blind studies, it has been found that about 200 grams of hydrated clinoptilolite zeolite chips added to a standard cat litter pan which contained about 3 to 4 pounds of standard clay litter extended the life of the litter by 2 to 3 times (9 to 10 days as compared to about 3 days for standard litter material). There was no appreciable odor at the end of this period and all solid wastes were removed.

The present invention may be embodied in other specific forms without departing from the spirit or essential attributes thereof and, accordingly, reference should be made to the appended claims, rather than to the foregoing specification, as indicating the scope of the invention. We claim:

1. A method for reducing ammonia odor from sorptive, non-colloidal granular aluminosilicate containing animal litter which comprises adding uncalcined hydrated zeolite to said litter in an amount effective to reduce the ammonia odor.

2. The method of claim 1 wherein said zeolite is clinoptilolite.

3. The method of claim 1 wherein said zeolite is in the form of chips.

4. The method of claim 1 wherein said zeolite is added in the form of a zeolite containing pad comprising a top layer of sorptive sheet material, a bottom layer of sorptive sheet material and said zeolite disposed between said layers.

5. The method of claim 1 wherein said sorptive, non-colloidal granular aluminosilicate comprises clay.

6. The method of claim 5 wherein said clay comprises fuller's earth.

7. The method of claim 1 wherein said effective amount of hydrated zeolite is between about 10 weight percent and about 60 weight percent of the total weight of said zeolite and said sorptive, non-colloidal granular aluminosilicate.

8. The method of claim 7 wherein said amount is between about 15 weight percent and about 25 weight percent of the total weight of said zeolite and said sorptive, non-colloidal granular aluminosilicate.

9. An animal litter comprising sorptive, non-colloidal granular aluminosilicate and an amount of uncalcined hydrated zeolite effective to reduce ammonia odor.

10. The animal litter of claim 9 wherein said effective amount of hydrated zeolite is between about 10 weight percent and about 60 weight percent of the total weight of said zeolite and said sorptive, non-colloidal granular aluminosilicate.

11. The animal litter of claim 9 wherein said zeolite is in the form of chips.

12. The animal litter of claim 9 wherein said zeolite is added in the form of a zeolite containing pad comprising a top layer of sorptive sheet material, a bottom layer of sorptive sheet material and said zeolite disposed between said layers.

13. The animal litter of claim 9 wherein said sorptive, non-colloidal granular aluminosilicate comprises clay.

14. The animal litter of claim 13 wherein said clay comprises fuller's earth.

15. The animal litter of claim 9 wherein said zeolite is clinoptilolite.

16. The animal litter of claim 15 wherein said amount is between about 15 weight percent and 25 weight percent of the total weight of zeolite and the sorptive, non-colloidal granular aluminosilicate.

17. A pad for use in conjunction with animal litter comprising a top layer of sorptive sheet material and a bottom layer of sorptive sheet material, and uncalcined hydrated zeolite disposed between said layers.

18. The pad of claim 17 wherein said zeolite is clinoptilolite.

* * * * *

Disclaimer 4,437,429.—*Joel Goldstein*, Ambler, Pa. and *Albert Abrevaya*, Chalfont, Pa. ANIMAL LITTER. Patent dated Mar. 20, 1984. Disclaimer filed May 22, 1985, by the assignee, *Aquarium Pharmaceuticals, Inc.*

Hereby enters this disclaimer to all claims of said patent.
[*Official Gazette July 30, 1985.*]